Nov. 4, 1952     C. E. CHRISTOPHERSEN     2,616,644
AXIALLY TIGHTENING CLAMP
Filed June 19, 1951
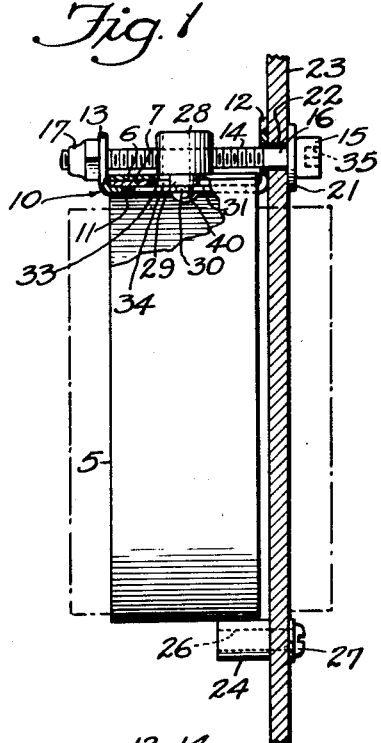
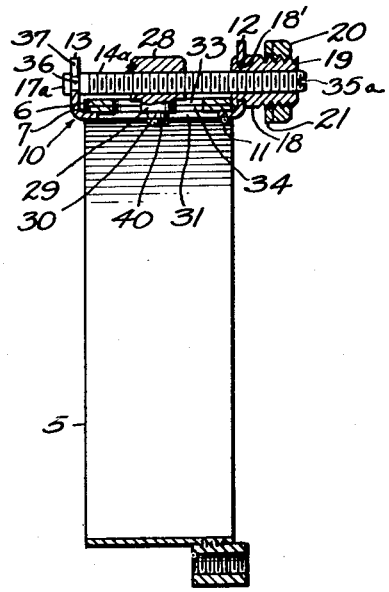
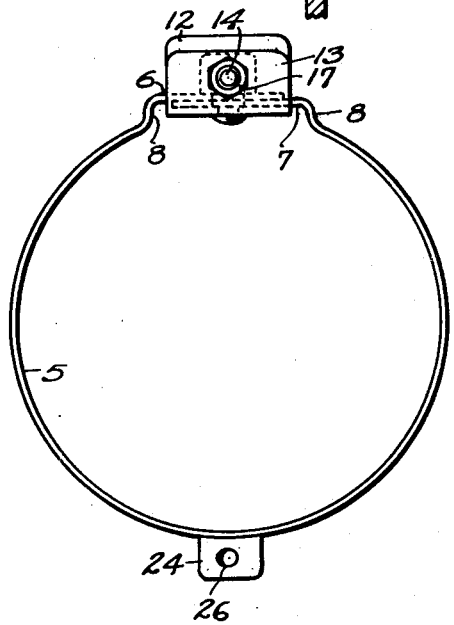
INVENTOR.
Clarence E. Christophersen
BY *Lynn A. Latta*
—ATTORNEY—

Patented Nov. 4, 1952

2,616,644

UNITED STATES PATENT OFFICE 2,616,644

AXIALLY TIGHTENING CLAMP

Clarence E. Christophersen, Inglewood, Calif., assignor to Marman Products Company, Inc., Inglewood, Calif., a corporation of California Application June 19, 1951, Serial No. 232,430

9 Claims. (Cl. 248—27)

This invention relates to band clamps. An object of the invention is to provide a band clamp particularly suitable for mounting a round member (such as a measuring or indicating instrument) to a panel (e. g. an instrument panel) and having means which is accessible from the front of the instrument panel (while the clamping band itself is located rearwardly of the panel) for tightening the band around the instrument to be mounted in the panel. To this end, the invention contemplates a clamp having tightening means including a rotatable actuator element disposed parallel to the axis of the clamp.

A further object of the invention is to provide such a clamp which is of relatively simple, inexpensive and yet durable construction.

Other objects will become apparent in the ensuing specifications and appended drawings in which:

Fig. 1 is a side view of a band clamp embodying my invention, installed on an instrument panel which is shown in cross section;

Fig. 2 is a front view of the same;

Fig. 3 is a plan view of the same; and

Fig. 4 is an axial sectional view of a modified form of the invention.

Referring now to the drawings in detail, the band clamp of my invention embodies a flexible constricting band 5 of resilient material, preferably metal ribbon. The band 5 has end portions 6 and 7 disposed in overlapping relation and connected to the body thereof by offset portions 8, by means of which the end portions 6 and 7 are disposed radially outwardly of the extended periphery of the band 5, so as to clear the periphery of an instrument which is embraced by the band. Such instrument is indicated in broken lines at 9 in Fig. 1.

Means for tightening the band includes a bracket 10 which is loosely associated with band end portions 6 and 7, for the purpose of supporting an operating screw 14. Bracket 10 is of yoke form, having a web portion 11 and ears 12 and 13 at the respective ends thereof. The web portion 11 lies against the inner side of band end portion 7 with ears 12, 13 extending radially outwardly past the respective edges of the band. The ears 12, 13 function to rotatably support the operating screw 14. A head 15 on one end of screw 14 bears against ear 12; one end of the screw is journalled in an opening in ear 12; and the other end of the screw is journalled in an opening in ear 13 and has a nut 17 secured thereon and functioning as a head which has end bearing engagement with the outer face of the ear 13. Nut 17 may be of a self-locking type so as to cling to screw 14 in locked engagement therewith.

Screw 14 has a short unthreaded portion 16 adapted to extend through an opening 22 in an instrument panel 23 to mount the band thereon, with the panel confined between ear 12 and a washer 21 which is backed up by head 15. Diametrically opposite yoke 10, a lug 24 is secured, as by welding, to the outer face of band 5. Lug 24 has a threaded bore 26 adapted to receive a screw 27 passed through panel 23. Thus lug 24 and screw 14 cooperate to secure the band to the panel at diametrically opposed points.

Threaded onto screw 14 is a follower nut 28. Nut 28 has an integral stud 29 projecting from one side thereof. Stud 29 has a reduced neck portion 30 which extends through an elongated slot 31 in web member 11, and terminates in a head 40 which engages the under face of web 11 to retain neck 30 in slot 31 and to retain the parts in assembly. Slot 31 is parallel to screw 14, whereby to provide guideways in which neck 30 may slide to restrain rotation of nut 28 as nut 28 travels along screw 14.

Stud 29 passes through crossed diagonal slots 33, 34 in band end members 6, 7 respectively. Slots 33, 34 cross slot 31 in oppositely inclined directions, at an angle within a range of 10° to 30°. Accordingly, as nut 28 travels along screw 14, stud 29 will exert a camming effect such as to draw the end members 6, 7 into increased overlap, thereby to tighten band 5. As stud 29 exerts axial pressure against the edges of slots 33, 34, the edges of band end portions 6, 7 at one axial extremity of the band, will be forced against ear 12 or 13 depending on the direction of actuation. For example, in tightening the band, the nut 28 will be drawn toward ear 12 and correspondingly the end portions 6, 7 will be drawn against ear 12. The reactive end load will be transferred from ear 12 through panel 23, washer 21 and head 15 back to screw 14. In loosening the band, the movement of nut 12 will be toward ear 13 and end portions 6, 7 will bear against that ear. It will now be apparent that ears 12, 13 function not only as bearings for the screw 14 but also as means to transfer the reactive load from end portions 6, 7 back to the screw. In this connection it may be noted that bracket 10 is loosely associated with end portions 6, 7, being connected thereto only by screw 14 and nut 28.

It will now be apparent that in the operation of the device, screw 14, assuming it to have a right hand may be rotated so as to drive nut 28 toward ear 12, thereby causing stud 29 to act against the edges of slots 33, 34 in a manner to constrict the band. The axial load thus developed on screw 14 will be taken by the end bearing engagement of head 15 against ear 12. When the screw is rotated in the opposite direction, the nut 17, bearing against ear 13, will cause the nut 28 to be backed off until the band is sufficiently loosened to release the instrument 9 or other member which is clamped thereby.

A screw driver recess 35 in the head 15 makes it possible to rotate the screw by the use of a "Philips" driver.

In the modified form of the invention shown in Fig. 4, the threaded end of screw 14a is journalled in a bushing 18 having a reduced neck portion 18' riveted into ear 12 and having an externally threaded portion 19 on which is threaded a nut 20. Bushing 18 is adapted to extend through an opening in a panel, with the panel clamped, by nut 20, between a washer 21 and ear 12. A screw driver slot 35a provides for actuation by a screw driver. The other end of the screw has a head 17a provided with an annular groove defining a reduced neck 36 joining a pair of opposed shoulders which engage opposite faces of ear 13 to take the axial, end-bearing loads in both directions. The reduced neck 36 is received in an open slot 37 in ear 13, to allow assembly of the parts.

I claim:

1. In a band clamp for attachment to the back of a supporting panel, a flexible band having overlapping end portions; a U-shaped bracket having a web portion extending parallel to the axis of the band and bearing against one of said end portions, and a pair of ears projecting radially outwardly from the respective ends of said web portion, said ears having aligned bearing means; a screw journalled in said bearing means, extending between and having end bearing engagement with said ears; and a follower nut threaded onto said screw and having a projection; said end portions having crossed, diagonal slots in which said projection is engaged for camming action in response to axial movement of said follower nut, through which said end portions are moved in opposite circumferential directions to tighten or loosen said band, upon rotation of said screw in one direction or the other.

2. In a band clamp for attachment to the back of a supporting panel, a flexible band having overlapping end portions; a bracket associated with said end portions, said bracket having a pair of bearings disposed adjacent the respective axial extremities thereof; a screw journalled in said bearings and having end bearing engagement with at least one of them; and a follower nut threaded on said screw and having a projection; said end portions having crossed, diagonal slots in which said projection is engaged for camming action in response to axial movement of said follower nut, through which said end portions are moved in opposite circumferential directions to tighten said band upon rotation of said screw in one direction.

3. In a band clamp for attachment to the back of a supporting panel, a flexible band having overlapping end portions; a U-shaped bracket having a web portion extending parallel to the axis of the brand and bearing against one of said end portions, and a pair of ears projecting radially outwardly from the respective ends of said web portion, said ears having aligned bearing openings; a screw having respective end portions extended through and journalled in said openings, said screw having at its respective ends, heads, one of which is adapted to have end bearing engagement with the outer face of one of the ears; the other head being adapted to be spaced from the outer face of the other ear whereby said panel may be interposed between said other head and said other ear, with the screw extending through and freely rotatable in the panel; and a follower nut threaded onto said screw and having a projection; said end portions having crossed, diagonal slots in which said projection is engaged for camming action in response to axial movement of said follower nut, through which said end portions are moved in opposite circumferential directions to tighten or loosen said band, upon rotation of said screw in one direction or the other.

4. A band clamp as defined in claim 1, wherein said web portion of the bracket has a slot extending parallel to said screw; said follower nut having an extension slidably engaged in said slot to restrain said nut against rotation.

5. A band clamp as defined in claim 1, wherein said web portion of the bracket has a slot extending parallel to said screw; said follower nut having an extension slidably engaged in said slot to restrain said nut against rotation, said extension comprising a reduced neck projecting axially from said stud, said stud terminating at said neck in a shoulder engaging one side of said web and said reduced neck having a head engaging the other side of said web to retain said reduced neck in said slot.

6. A band clamp as defined in claim 1, wherein one of said aligned bearing means comprises a bushing having one end attached to one of said ears and adapted to be received through an opening in the supporting panel, said bushing being externally threaded; and a mounting nut threaded onto said bushing, for securing the panel between said mounting nut and said one ear, said band having, at another point on its circumference, second means for attaching the band to said panel.

7. In a band clamp for attachment to the back of a supporting panel, a flexible band having overlapping end portions; a U-shaped bracket having a web portion extending parallel to the axis of the band and bearing against one of said end portions, and a pair of ears projecting radially outwardly from the respective ends of said web portion, said ears having aligned bearing openings; a screw having respective end portions extended through and journalled in said openings, said screw having at its respective ends, heads, one of which is adapted to have end bearing engagement with the outer face of one of the ears; the other head being adapted to be spaced from the outer face of the other ear whereby said panel may be interposed between said other head and said other ear, with the screw extending through and freely rotatable in the panel, means on said band at a point substantially diametrically opposite said screw, for attaching the band to the panel; and a follower nut threaded onto said screw and having a projection; said end portions having crossed, diagonal slots in which said projection is engaged for camming action in response to axial movement of said follower nut, through which said end portions are moved in opposite circumferential directions to tighten or loosen said band, upon rotation of said screw in one direction or the other.

8. In a band clamp for attachment to the back of a supporting panel, a flexible band having overlapping end portions; a U-shaped bracket having a web portion extending parallel to the axis of the band and bearing against the inner face of the inner end portion, and a pair of ears projecting radially outwardly from the respective ends of said web portion extending radially outwardly past the axial edges of and closely embracing said end portions to provide for axial load bearing engagement therewith, said ears having aligned bearing means; a screw journalled in said bearing means, extending between and having end bearing engagement with said ears; and a follower nut threaded onto said screw and having a projection; said end portions having crossed, diagonal slots in which said projection is engaged for camming action in response to axial movement of said follower nut, through which said end portions are moved in opposite circumferential directions to tighten or loosen said band, upon rotation of said screw in one direction or the other.

9. In a band clamp for attachment to the back of a supporting panel, a flexible band having overlapping end portions; a U-shaped bracket having a web portion extending parallel to the axis of the band and bearing against the inner face of the inner end portion, and a pair of ears projecting radially outwardly from the respective ends of said web portion extending radially outwardly past the axial edges of and closely embracing said end portions to provide for axial load bearing engagement therewith, said ears having aligned bearing means; a screw journalled in said bearing means, extending between and having end bearing engagement with said ears; and a follower nut threaded onto said screw and having a projection; said end portions having crossed, diagonal slots in which said projection is engaged for camming action in response to axial movement of said follower nut, through which said end portions are moved in opposite circumferential directions to tighten or loosen said band, upon rotation of said screw in one direction or the other; said web portion of the bracket having a slot extending parallel to said screw; and said follower nut having an extension slidably engaged in said slot to restrain said nut against rotation.

CLARENCE E. CHRISTOPHERSEN.

No references cited.